A. CONNOLLY AND J. W. McCOY.
ANTISKID ARMOR FOR PNEUMATIC TIRES.
APPLICATION FILED APR. 8, 1920.
1,371,019.
Patented Mar. 8, 1921.
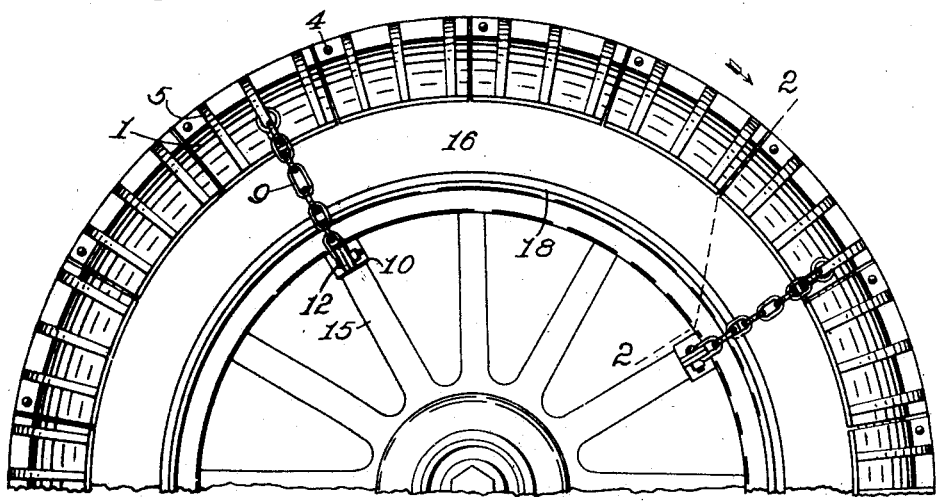
Fig. 1.
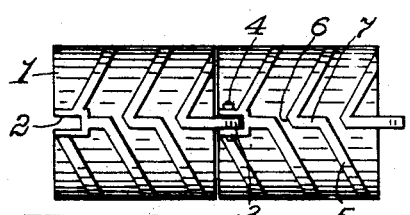
Fig. 3.
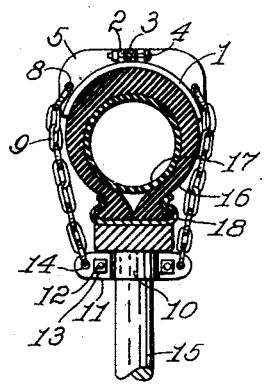
Fig. 2.
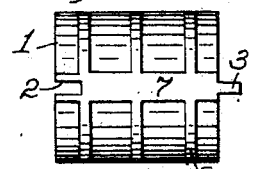
Fig. 4.
Fig. 5.
Inventors,
Arthur Connolly, and
John W. McCoy, by
G. C. Kennedy,
Attorney.

UNITED STATES PATENT OFFICE.

ARTHUR CONNOLLY AND JOHN W. McCOY, OF WATERLOO, IOWA.

ANTISKID-ARMOR FOR PNEUMATIC TIRES.

1,371,019. Specification of Letters Patent. Patented Mar. 8, 1921.

Application filed April 8, 1920. Serial No. 372,236.

*To all whom it may concern:*

Be it known that we, ARTHUR CONNOLLY and JOHN W. McCOY, citizens of the United States of America, and residents of Waterloo, Blackhawk county, Iowa, have invented certain new and useful Improvements in Antiskid-Armor for Pneumatic Tires, of which the following is a specification.

Our invention relates to improvements in anti-skid armor for pneumatic tires, and the objects of our improvements are to furnish light, inexpensive, hingedly-connected elements for covering flexibly and protecting the tread portion of a tire, and to combine with these elements means for preventing skidding on icy or slippery surfaces, suitable also in insuring proper traction engagement with soft or yielding soils.

These objects we have accomplished by the means which are hereinafter described and claimed, and which are illustrated in the accompanying drawings, in which Figure 1 is a side elevation of a vehicle wheel having a pneumatic tire on which is mounted and secured our improved antiskid armor, the upper half only of the wheel being shown; Fig. 2 is a transverse section of the pneumatic tire and armor as mounted on a spoke and secured thereto, and taken on the broken line 2—2 of said Fig. 1, looking in the direction indicated by the arrow. Fig. 3 is a plan view of two of the alined and hingedly connected armor elements, and Figs. 4 and 5 are plan views of differently modified armor elements.

Similar numerals of reference denote corresponding parts throughout the several views.

We have illustrated in said Fig. 1 a passenger vehicle wheel whose spokes carry the usual felly and channel rim 18, the combined compressed air tube 17 and tire-casing 16 being mounted on said rim under inflation as usual.

Our improved anti-skid armor is designed to surround and protect only the usual tread surface of the tire-casing 16. This armor comprises a flexible cover made up of like arcuate longitudinally troughed and hingedly connected armor elements, preferably made of thin steel, and which closely fit the circumferential tread surface of said casing.

The simplest form of the armor element is shown in Fig. 5, in plan, a number of these being assembled and shown in side elevation in said Fig. 1. Each element 1 is of arcuate longitudinally troughed form, and in the form shown in said figures, has a raised medial longitudinal rib 7, the element and said rib having a rectangular notch or socket 2 at one end, and having a longitudinal projection 3 at the other end. Each projection 3 and the socketed parts of the rib 7 of the abutting element which receives it, are orificed in line to receive a pintle-bolt 4 secured by a nut. By this means, a sufficient number of the elements are hingedly connected together and therefore, may be mounted to fit upon the circumferential tread surface of a tire-casing 16, flexibly. This longitudinal rib 7 may have transversely and oppositely extending raised ribs or projections 5, which may extend at right angles as in Figs. 1 and 5, or obliquely thereto, as in Fig. 4. These ribs 5 are preferably progressively widened from the rib 7 outwardly to provide angular mud-engaging lugs, as shown in Fig. 2. The oblique ribs 5 may all extend transversely in the same direction, or in different or opposed directions, as shown in Fig. 3, wherein the ribs 5 on each side are also staggered in relation to each other, and portions of the longitudinal rib 7 removed at 6 to afford an increased amount of engagement with the surface traversed.

We have shown in Figs. 1 and 2 fastening-means wherein end-links of a pair of short chains 9 are secured in orifices 8 in opposite ribs 5, the end links of the other ends of said chains being secured in orifices 14 of abutting lugs 11 of half clip-rings 10 secured around the spoke 15 by bolts 12 and nuts 13, the chains embracing opposite sides of the casing 16 and preventing displacement of the armor.

The elements 1 prevent punctures of the casing 16, while the ribs 7 and 5 engage the surface traversed, preventing skidding of the wheel, while the widened ends of the rib 5 engage muddy soils, permitting proper tractive efforts to the wheel.

Having described our invention, what we claim as new, and desire to secure by Letters Patent, is:

1. Anti-skid armor for pneumatic tires, comprising like arcuate longitudinally troughed members hingedly connected together about a tire to movably fit upon its circumferential tread surface only, each member having a plurality of spaced pairs of staggered oppositely inclined ribs, the ribs of each pair being united by a medial longitudinal rib, and means for removably fastening said armor upon the tire.

2. Anti-skid armor for pneumatic tires, comprising rigid members hingedly connected together about a tire-tread, and means for removably securing said armor upon the tire, each member having raised transverse tread elements, spaced circumferentially from each other, and having forwardly-directed medial salient angles.

Signed at Waterloo, Iowa, this 16th day of March, 1920.

ARTHUR CONNOLLY.
JOHN W. McCOY.